United States Patent
Sakurai et al.

(10) Patent No.: US 7,401,983 B2
(45) Date of Patent: Jul. 22, 2008

(54) METHOD FOR MANUFACTURING OPTICAL COUPLING PART AND OPTICAL COUPLING PART

(75) Inventors: Wataru Sakurai, Kanagawa (JP);
Kazuhito Saito, Kanagawa (JP); Hideo Numata, Tokyo (JP); Chiaki Takubo, Tokyo (JP); Hideto Furuyama, Tokyo (JP); Hiroshi Hamasaki, Tokyo (JP)

(73) Assignees: Sumitomo Electric Industries, Ltd., Osaka (JP); Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 11/640,861

(22) Filed: Dec. 19, 2006

(65) Prior Publication Data
US 2007/0165986 A1    Jul. 19, 2007

(30) Foreign Application Priority Data
Dec. 19, 2005   (JP) .......................... P.2005-365537

(51) Int. Cl.
*G02B 6/36* (2006.01)
(52) U.S. Cl. .......................................... 385/88; 385/90
(58) Field of Classification Search .................. 385/88, 385/90
See application file for complete search history.

(56) References Cited

U.S. PATENT DOCUMENTS

| 5,774,614 | A  | * | 6/1998  | Gilliland et al. ............... 385/88 |
| 6,257,770 | B1 | * | 7/2001  | Sato .............................. 385/78 |
| 6,517,259 | B1 | * | 2/2003  | Murata ......................... 385/92 |
| 2005/0063651 | A1 | | 3/2005 | Hamasaki et al. |
| 2005/0169596 | A1 | | 8/2005 | Hamasaki et al. |
| 2006/0039658 | A1 | | 2/2006 | Furuyama et al. |
| 2006/0291783 | A1 | | 12/2006 | Hamasaki et al. |

FOREIGN PATENT DOCUMENTS

| JP | 2001-159724 A | 6/2001 |
| JP | 2005-43622 | 2/2005 |

OTHER PUBLICATIONS

Official Filing Receipt of U.S. Appl. No. 11/531,922, filed Sep. 14, 2006, and specification thereof.

* cited by examiner

*Primary Examiner*—Ellen Kim
(74) *Attorney, Agent, or Firm*—McDermott Will & Emery LLP

(57) ABSTRACT

After a wiring plate 30 having a plurality of leads 31 been insert-molded to an edge face 21 of a molded article 20, unwanted portions of the wiring plate 30 are cut, thereby enabling easy three-dimensional wiring. As a result, an electrode terminal section 43 of a photoelectric conversion element 41 disposed opposite an end face 11b of an optical fiber 11 can be electrically coupled to an electrical wiring section 23 of an optical coupling part 10.

10 Claims, 8 Drawing Sheets

METHOD FOR MANUFACTURING OPTICAL COUPLING PART AND OPTICAL COUPLING PART

TECHNICAL FIELD

The present disclosure relates to a method for manufacturing an optical coupling part and an optical coupling part; for example, a method for manufacturing an optical coupling part used for connecting an optical fiber to a photoelectric conversion element, and to an optical coupling part manufactured thereby.

RELATED ART

In association with development of a broadband network, demand for speedup and larger capacity is increasing in the field of a router serving as a network node and, more particularly, in the field of personal digital electronics. In response to this demand, there is growing consideration of introduction of optical interconnection, wherein photoelectric conversion is effected at input and output sections of electrical transmission, and a large volume of information is transmitted at high speed by making the most of a broadband characteristic of the optical fiber. There has been disclosed a technique for coupling a photoelectric conversion element (a light-emitting element or a light-receiving element) with an optical fiber at a photoelectric conversion section (see Patent Document 1: Japanese Patent Unexamined Publication No. 2005-43622).

Incidentally, under a method for manufacturing the optical coupling part described in Patent Document 1, electrical wiring formed on an edge face and a side surface continual to the edge face of an optical fiber positioning section leads to an increase in the degree of freedom of a connection position of the photoelectric conversion element. In the first place, difficulty is encountered in forming a three-dimensional electrical wiring continually over an object.

SUMMARY

Embodiments of the present invention provide a method for manufacturing an optical coupling part which facilitates realization of three-dimensional electrical wiring, as well as an optical coupling part manufactured thereby.

A first method for manufacturing an optical coupling part for connecting an optical fiber with a photoelectric conversion unit having a photoelectric conversion element according to one ore more embodiments of the present invention, comprises steps of:

insert-molding a wiring plate, which is to serve as an electrical wiring section and has a plurality of leads, into a molded element into which an optical fiber is be inserted;

positioning an active layer of the photoelectric conversion element to an optical fiber insertion hole formed in an edge face of the molded element; and fastening the photoelectric conversion unit having the photoelectric conversion element to the edge face of the molded element with an electrode terminal section of the photoelectric conversion element remaining in contact with the leads of the wiring plate.

Under the method for manufacturing an optical coupling part configured as mentioned above, a wiring plate having a plurality of leads is molded into a molded element by means of insert-molding. Accordingly, three-dimensional electrical wiring can be realized readily. As a result, a photoelectric conversion unit housing a photoelectric conversion element can be fastened to an edge face of the molded element while an electrode terminal section of the photoelectric conversion element remains in contact with the leads of the wiring plate.

A second method for manufacturing an optical coupling part according to one ore more embodiments of the present invention is further characterized in view of the first method of the present invention, wherein the method further comprises a step of:

bending a portion of the wiring plate and bonding the thus-bent portion to the edge face of the molded element or a side surface continual to the edge face.

Under the method for manufacturing an optical coupling part configured above, a portion of the wiring plate is bent, and the thus-bent portion is bonded to another face continual to the surface of the molded element into which the wiring plate has been insert-molded, thereby readily enabling three-dimensional electrical wiring.

Moreover, a third method for manufacturing an optical coupling part according to one ore more embodiments of the present invention is further characterized in view of the first or second method of the present invention, wherein the method further comprises steps of:

placing, between upper and lower metal molds, a first slide core having a core pin for forming an insertion hole into which is inserted the optical fiber in the molded element, and a second slide core which is disposed opposite the first slide core and forms the edge face of the molded element, and positioning the core pin of the first slide core to the second slide core while the first slide core and the second slide core are brought into close proximity to each other;

arranging the wiring plate in a cavity formed between the upper and lower metal molds;

applying resin into the cavity, to thus subject the wiring plate to insert molding; and moving the first slide core and the second slide core in a mutually-departing direction and subsequently removing from the metal molds a molded element into which the wiring plate Under the method for manufacturing an optical coupling part configured above, the edge of the core pin of the first slide core used for forming in a molded element the insertion hole, into which the optical fiber is to be inserted, is latched to the second slide core. Accordingly, the core pin can be accurately positioned, and the insertion hole can be formed with high accuracy. Moreover, a wiring plate can be readily attached to a molded element by means of subjecting the wiring plate to insert-molding.

Moreover, a fourth method for manufacturing an optical coupling part according to one ore more embodiments of the present invention is further characterized in view of any one of the first to third methods of the present invention, wherein the wiring plate is arranged along the edge face of the molded element formed by he second slide core.

Under the method for manufacturing an optical coupling part configured as described above, the wiring plate is mounted between the edge faces of the upper and lower metal molds and the second slide core, and resin is applied into the space, so that the wiring plate can be insert-molded to the edge face of the molded element.

A fifth method for manufacturing an optical coupling part according to one ore more embodiments of the present invention is further characterized in view of any one of the first to third methods of the present invention, wherein the wiring plate is disposed along a parting line between the upper and lower metal molds.

Under the method for manufacturing an optical coupling part configured above, the wiring plate is arranged along a parting line between the upper and lower metal molds, and resin is applied into a cavity of the metal molds, so that a plurality of leads of the wiring plate can be preferably arranged on the side surface of a molded element with respect to the photoelectric conversion element.

A sixth method for manufacturing an optical coupling part according to one ore more embodiments of the present invention is further characterized in view of the fourth or fifth method of the present invention, wherein the insert-molded wiring plate is subjected to electroless plating before fastening of the photoelectric conversion unit.

Under the method for manufacturing an optical coupling part configured above, the wiring plate is subjected to electroless plating before fastening of the photoelectric conversion unit. Preferably, the wiring plate is subjected to gold-plating, thereby enhancing the conductive performance of the leads.

A seventh method for manufacturing an optical coupling part according to one ore more embodiments of the present invention is further characterized in view of anyone of the fourth to sixth methods of the present invention, wherein the method further comprises a step of affixing a fastening tape for preventing occurrence of deformation of the leads, which would otherwise arise during applying resin, to the leads of the wiring plate.

Under the method for manufacturing an optical coupling part configured above, when a molded element is manufactured by means of applying resin, the wiring plate is affixed with a fastening tape, and hence deformation of the leads can be prevented.

An eighth method for manufacturing an optical coupling part according to one or more embodiments of the present invention is further characterized in view of the seventh method of the present invention, wherein the fastening tape is formed from a synthetic resin material having heat resistance, such as polyimide.

Under the method for manufacturing an optical coupling part configured above, the wiring plate is fastened by use of a fastening tape formed from a synthetic resin having heat resistance, such as polyimide or the like. Accordingly, when a molded element is manufactured by applying resin, deformation of the leads can be prevented.

A ninth method for manufacturing an optical coupling part according to one ore more embodiments of the present invention is further characterized in view of the seventh method of the present invention, wherein the fastening tape is formed from metal which is essentially equivalent to the wiring plate in terms of a coefficient of linear expansion, such as aluminum, copper, or the like.

Under the method for manufacturing an optical coupling part configured above, the wiring plate is fastened by use of a fastening tape formed from metal which is essentially equivalent to the wiring plate in terms of a coefficient of linear expansion, such as aluminum, copper, or the like. When a molded element is manufactured by applying resin, deformation of the leads, which would otherwise be caused by thermal expansion of the fastening tape as in the case of the wiring plate, can be prevented.

A tenth optical coupling part according to one ore more embodiments of the present invention is characterized by an optical coupling part manufactured under the method for manufacturing an optical coupling part defined in any of the first to ninth methods of the present invention.

In an optical coupling part configured as mentioned above, a wiring plate having a plurality of leads is molded into a molded element by means of insert-molding. Accordingly, three-dimensional electrical wiring can be realized readily.

As a result, there can be manufactured an optical coupling part, in which a photoelectric conversion unit housing a photoelectric conversion element is fastened to a molded element while the electrode terminal section of the photoelectric conversion element remains in contact with the leads of the wiring plate.

Various implementations may include one or more the following advantages. For example, According to one or more embodiments of the present invention, a wiring plate having a plurality of leads is insert-molded to an edge face of a molded element or a side surface continual to the edge face, so that three-dimensional electrical wiring can be effected readily. As a result, there is yielded an advantage of the ability to fasten a photoelectric conversion unit housing a photoelectric conversion element to a molded element while an electrode terminal section of the photoelectric conversion element disposed opposite the edge face of the optical fiber remains in contact with leads of the wiring plate, thereby facilitating manufacture of an optical coupling part.

Other features and advantages maybe apparent from the following detailed description, the accompanying drawings and the claims.

DETAILED DESCRIPTION

A preferred embodiment of the present invention will be described in detail hereunder by reference to the drawings.

Figure 1:
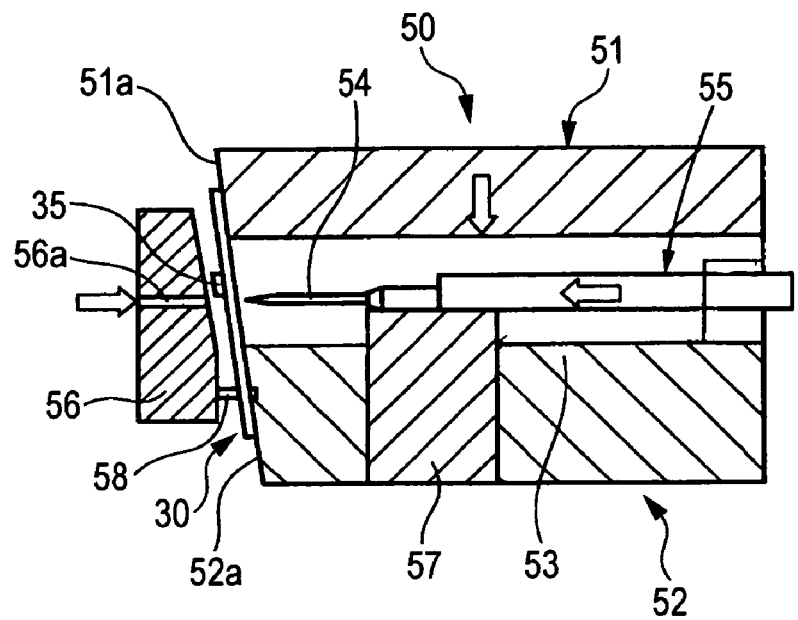
FIG. 1 is a cross-sectional view showing a method of manufacturing an optical coupling part according to a first embodiment of the present invention.
Figure 2:
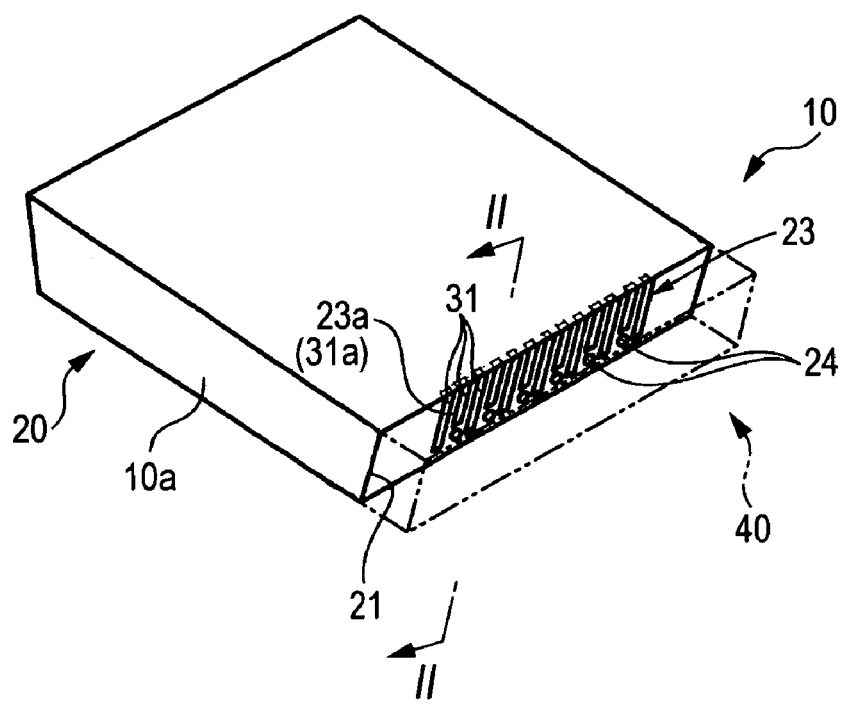
FIG. 2 is a perspective view of the optical coupling part of the present invention when viewed from the top.
Figure 3:
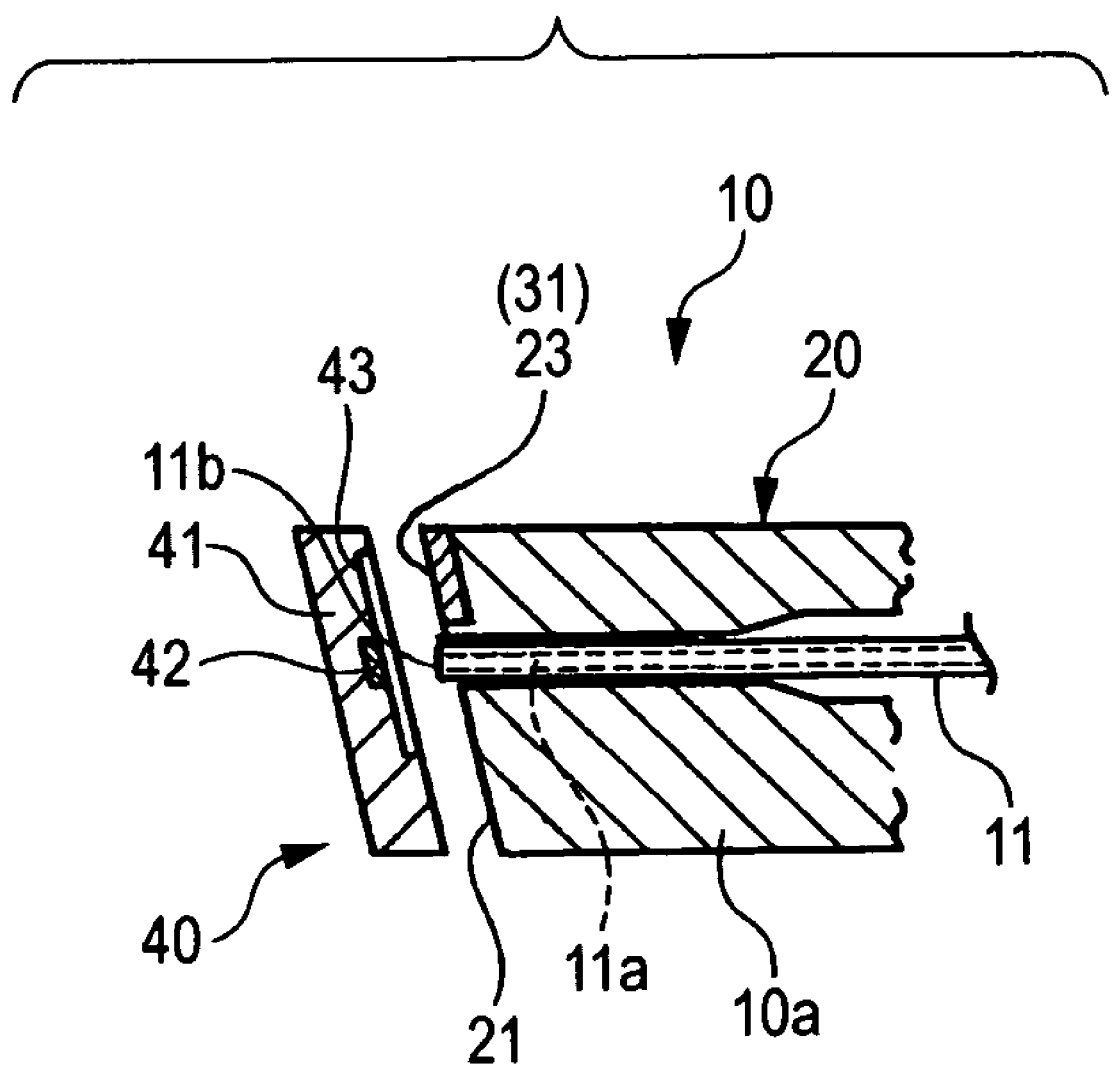
FIG. 3 is a cross-sectional view acquired along position II-II shown in FIG. 2.
Figure 5:
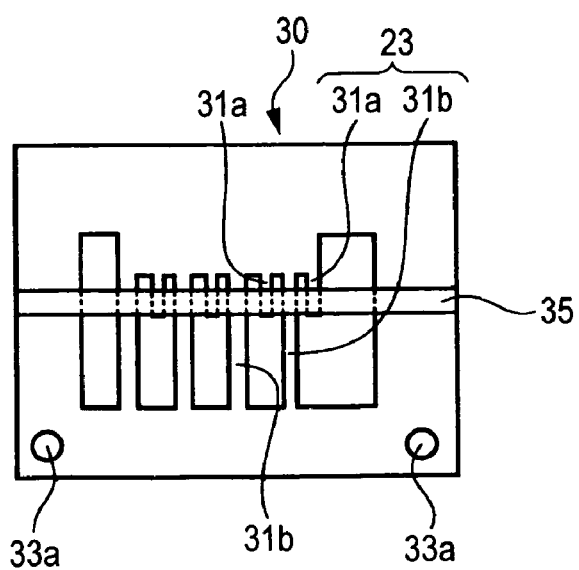
FIG. 5 is a plan view of a wiring plate.
Figure 6:
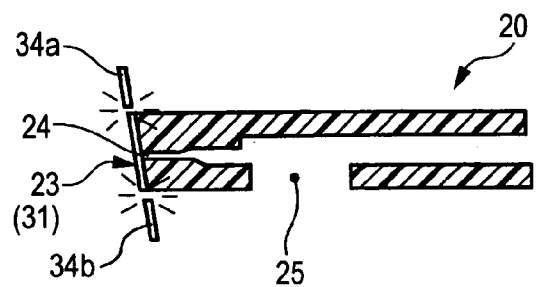
FIG. 6 is a side view showing that unwanted portions of an insert-molded wiring plate are cut.

FIG. 1 is a cross-sectional view showing a method of manufacturing an optical coupling part according to a first embodiment of the present invention; FIG. 2 is a perspective view of the optical coupling part of the present invention when viewed from the top; FIG. 3 is a cross-sectional view acquired along position II-II shown in FIG. 2; FIGS. 4A to 4D are cross-sectional views for describing a method for manufacturing the optical coupling part; FIG. 5 is a plan view of the wiring plate; and FIG. 6 is a side view showing that unwanted portions of an insert molded wiring plate are cut.

As shown in FIGS. 2 and 3, an optical coupling part 10 of the present invention is configured such that a photoelectric conversion unit 40 having a photoelectric conversion element 41 is integrally attached to an edge face 21 of a molded element 20 into which a leading end portion 11a of an optical fiber 11 is inserted and exposed.

The molded element 20 has a main body 10a formed into an essentially rectangular element, and an electrical wiring section 23 which is electrically connected to an electrode terminal section 43 of the photoelectric conversion element 41 is disposed on the edge face 21.

A method for manufacturing such an optical coupling section 10 comprises: a step of insert-molding a wiring plate 30 (see FIG. 5), which serves as the electrical wiring section 23 and has a plurality of leads 31, to the edge face 21 of the molded element 20 (see FIG. 1); and a step of positioning an active layer 42 of the photoelectric conversion element 41 to an optical fiber insertion hole 24 formed in the edge face 21 of the molded element 20 and fastening the photoelectric conversion unit 40 to the molded element 20 while the electrode terminal section 43 of the photoelectric conversion element 41 remains in contact with the leads 31 of the wiring plate 30.

As mentioned above, the optical coupling part 10 comprises the main body 10a corresponding to the molded element 20 which is entirely in an essentially-rectangular form; and the photoelectric conversion unit 40 attached to the edge face 21 of the main body 10a. The electrical wiring section 23 is provided at the edge face 21 of the main body 10a. For instance, in FIG. 2, the optical fiber insertion hole 24 that enables exposure of an end face 11b of the optical fiber 11 is provided at the position of a short electrical wiring section 23a.

Meanwhile, the photoelectric conversion unit 40 has the active layer 42 of the photoelectric conversion element 41 and the electrode terminal section 3 for activating the active layer 42. The active layer 42 is positioned to an area of the edge face 21 of the main body 10a opposing the optical fiber insertion hole 24, and the electrode terminal section 43 is provided so as to contact the electrical wiring section 23 of the main body 10a.

Thus, as a result of the optical coupling part 10 being mounted on a substrate (omitted from the drawings), the optical coupling part 10 is provided with power from the electrical wiring section 23, to thus activate the photoelectric conversion element 41. The photoelectric conversion element 41 can emit an optical signal to the optical fiber 11 or transmit a signal upon receipt of the optical signal from the optical fiber 11.

As shown in FIG. 1, a mold 50 used for manufacturing the optical coupling part 10 has an upper metal mold 51 and a lower metal mold 52. By means of combination of the upper and lower metal molds 51 and 52, a cavity 53 for forming the main body 10a of the optical coupling part 10 is formed in the mold 50. There are provided, between the upper and lower metal molds 51 and 52, a first slide core 55 having a core pin 54 used for forming in the molded element 20 the insertion hole 24 (see FIG. 3) into which the optical fiber 11 is to be inserted, and a second slide core 56 disposed opposite the first slide core 55 and used for forming in the molded element 20 the edge face 21 from which the leading end section 11a of the optical fiber 11 becomes exposed.

A protuberance section 57 for adjusting the height of the first slide core 55 is provided in a nested manner in the center of the lower metal mold 52 so that the position of the protuberance section can be vertically adjusted. During applying resin, the protuberance section 57 supports the first slide core 55 from below. When the optical fiber 11 is fixed to the manufactured optical coupling part 10, an adhesive applying port 25 (see FIG. 6) used for applying an adhesive is formed.

A positioning hole 56a used for positioning the core pin 54 is formed in the second slide core 56. The core pin 54 can be positioned accurately within the cavity 53 by means of inserting the leading edge of the core pin 54 into the positioning hole 56a.

Figure 4A:
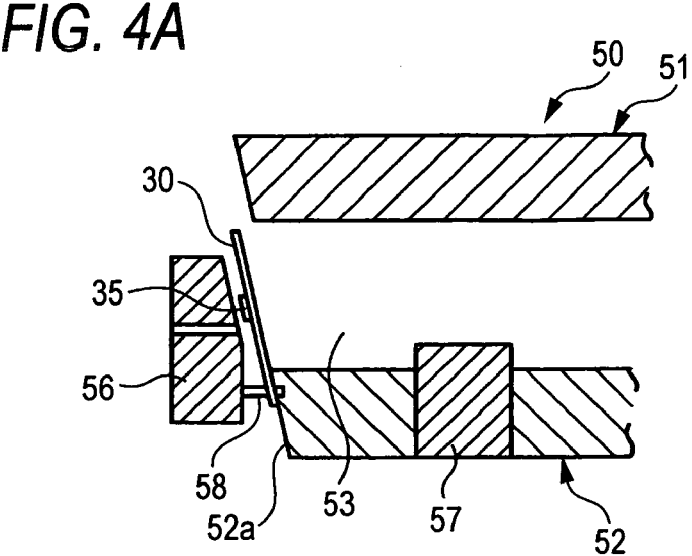
FIGS. 4A to 4D are cross-sectional views for describing a method for manufacturing the optical coupling part.
Figure 4B:
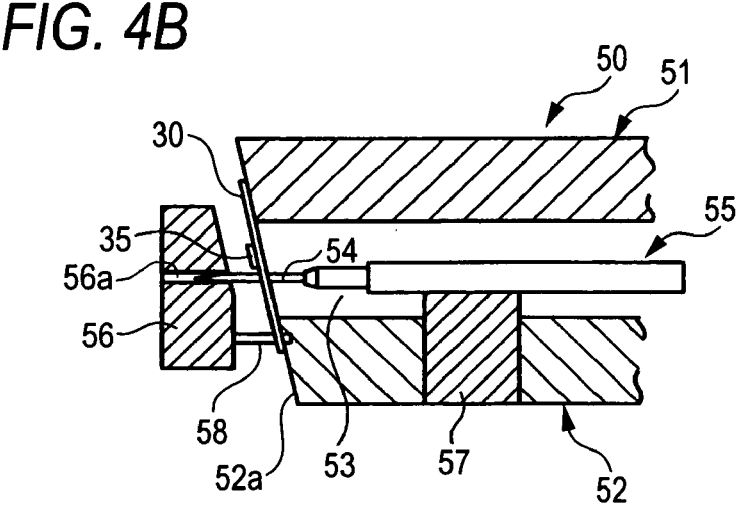
Figure 4C:
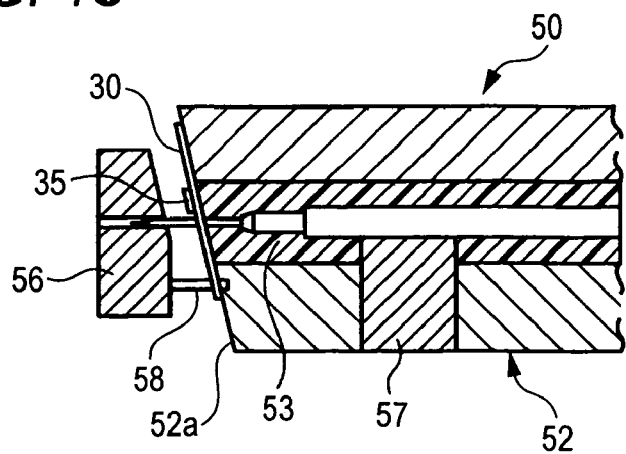
Figure 4D:
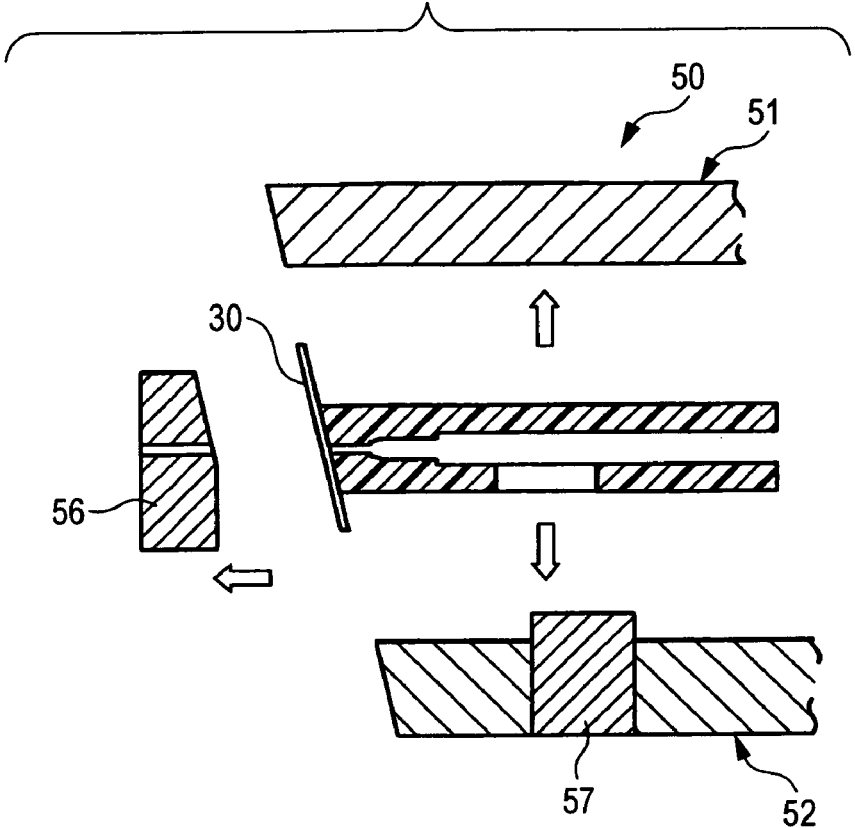

As shown in FIGS. 4A to 4D, resin-molding of the main body 10a comprises a step of positionally regulating the wiring plate 30 having the plurality of leads 31 at a predetermined position by means of the second slide core 56 and positioning the wiring plate 30 within the cavity 53 formed by the upper and lower metal molds 51 and 52 (see FIG. 4A); a step of positioning, in a latching manner, the core pin 54 of the first slide core 55 in the positioning hole 56a of the second slide core 56 while the first slide core 55 and the second slide core 56 remain in close proximate to each other (see FIG. 1) (see FIG. 4B); a step of applying resin into the cavity 53, thereby insert-molding the wiring plate 30 (see FIG. 4C); and a step of moving the first slide core 55 and the second slide core 56 in a mutually-departing direction and removing, from the metal mold 50, the molded element 20 into which the wiring plate 30 has been insert-molded (see FIG. 4D).

As shown in FIG. 5, a plurality of leads 31 (31a, 31b) are formed in the wiring plate 30, and one wiring plate 30 is applied to every optical coupling part 10. As shown in FIG. 1, holes 33a formed in the wiring plate 30 are positioned by positioning pins 58 provided on the end face 52a of the lower metal mold 52. Thereby, the wiring plate 30 can be positioned to the metal mold 50 with high accuracy.

The leads 31 in the wiring plate 30 can be formed by means of; e.g., etching or a punch press.

As shown in FIG. 5, the electrical wiring section 23 to be provided on the edge face 21 of the molded element 20 is formed on the wiring plate 30. Leads 31a, which are formed short to make interference with the optical fiber insertion hole 24, and leads 31b, which are long because they have no chance of interfering with the optical fiber insertion hole 24, are formed in the electrical wiring section 23. Both ends of the longer leads 31b are supported by the wiring plate 30. In contrast, the shorter leads 31a assume a cantilever structure, wherein only single ends of the shorter leads 31a are supported and the other ends of the same are released. Therefore, there is a potential risk of the shorter leads 31a being deformed by the pressure of resin at the time of applying resin into the metal mold 50, to thereby cause positional displacement. Therefore, a fastening tape 35 for fastening leading edges of the shorter leads 31a are affixed to the wiring plate 30 so as to cross each other to the leads 31a, 31b of the wiring plate 30.

When the molded element 20 is manufactured by applying resin, the wiring plate 30 is affixed by the fastening tape 35. Hence, deformation of the leads 31 can be prevented, and the wiring plate 30 can be accurately insert-molded to the edge face 21 of the molded element 20.

Synthetic resin material having heat resistance; e.g., polyimide, can be used as a material of the fastening tape 35. Alternatively, there can also be used metal which is essentially equivalent to the wiring plate 30, such as aluminum, copper, or the like, in terms of a coefficient of linear expansion.

As a result, there can be prevented deformation of the leads 31a, which would otherwise be caused when resin is applied to manufacture the molded element 20. By means of the wiring plate 30 being fastened through use of the fastening tape 35 that is essentially equivalent to the wiring plate 30 in terms of a coefficient of linear expansion, the fastening tape 35 thermally expands as does the wiring plate 30, so that deformation of the leads 31a, 31b can be prevented.

Accordingly, as shown in FIGS. 1 and 4, during manufacture of the optical coupling part 10, the metal molds 51, 52 are assembled together, and the wiring plate 30 is positioned by means of the positioning pins 58 provided on the edge face 52a of the lower metal mold 52. The protuberance section 57 is adjusted to a predetermined height, and the first slide core 55 is inserted. Further, the second slide core 56 is attached to the lower metal mold 52 via the positioning pins 58, and the metal mold 50 is set. Subsequently, resin is applied into the cavity 53 within the metal mold 50, thereby insert-molding the wiring plate 30 to thus form the molded element 20 (see FIG. 2).

Subsequently, the metal mold 50 is disassembled, and the main body 10a into which the wiring plate 30 is insert-molded is removed. As shown in FIG. 6, unwanted portions 34a, 34b are removed from the wiring plate 30 insert-molded to the edge face 21 of the molded element 20, by means of trimming.

Notches are provided in advance at positions where unwanted portions are to be cut, thereby enabling easy cutting of unwanted portions at accurate positions. Alternatively, thin-wall portions are formed at cut positions by means of half-etching, and the thin-wall portions are cut.

After having been subjected to abrasion treatment, cut faces are subjected to electroless plating, to thus be finished. Cutting of the leads 31 can be continually performed by use of a custom-designed metal mold and is suitable for mass-production.

Subsequently, the photoelectric conversion unit 40 is attached to the edge face 21 of the molded element 20.

As above, according to the method for manufacturing the optical coupling component 10 of the previously-described first embodiment, the wiring plate 30 having the plurality of leads 31 is insert-molded to the edge face 21 of the molded element 20, and hence three-dimensional wiring can be effected readily. As a result, drive power can be supplied to the photoelectric conversion element 41 provided opposite the end face 11b of the optical fiber 11 by way of the electrical wiring section 23 of the optical coupling part 10, or a signal from the photoelectric conversion element 41 can be transmitted.

A method for manufacturing an optical coupling part according to a second embodiment of the present invention will now be described.

Figure 7:
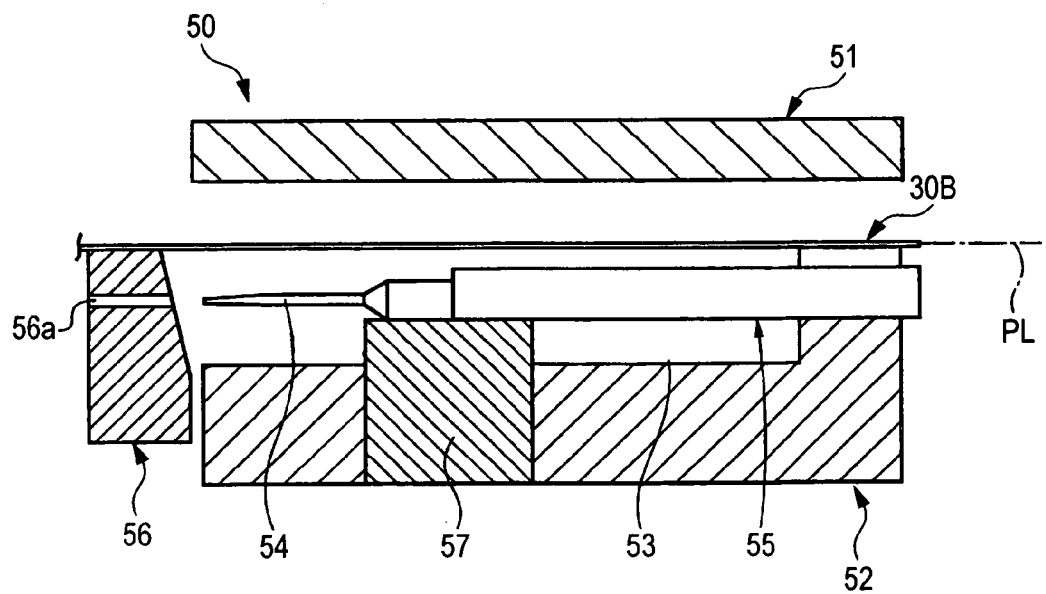
FIG. 7 is a cross-sectional view showing a method of manufacturing an optical coupling part according to a second embodiment of the present invention.
Figure 8:
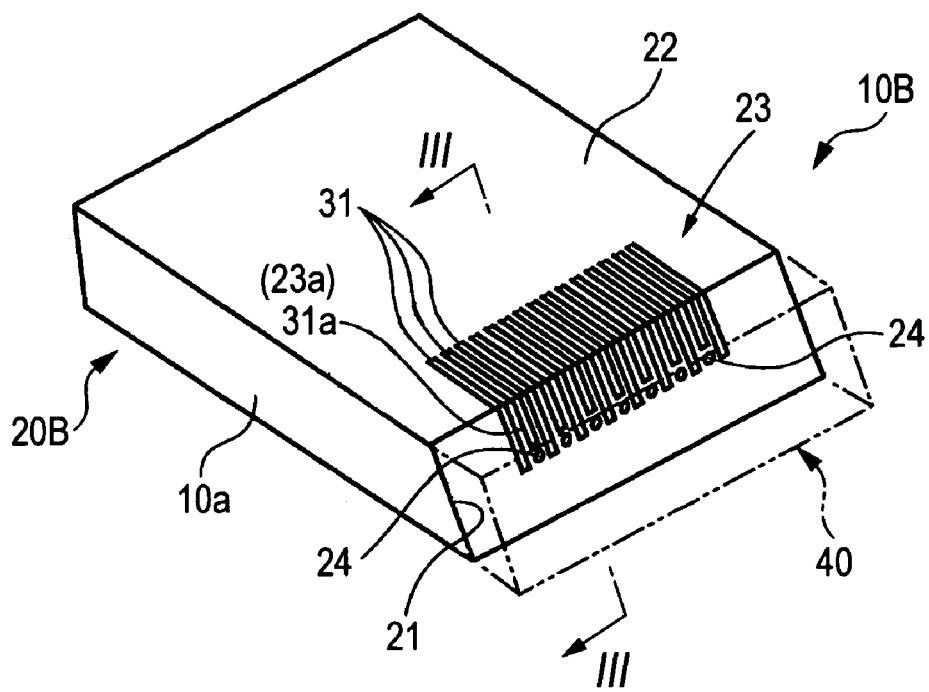
FIG. 8 is a perspective view of the optical coupling part of the present invention when viewed from the top.
Figure 9:
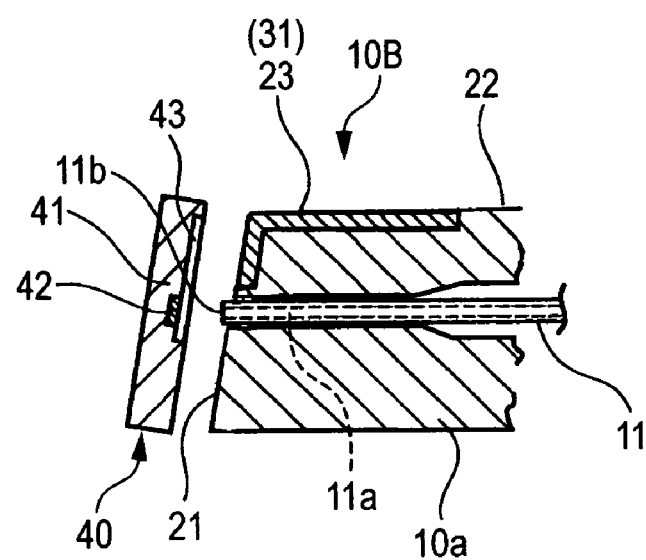
FIG. 9 is a cross-sectional view acquired along position III-III shown in FIG. 8.
Figure 10:
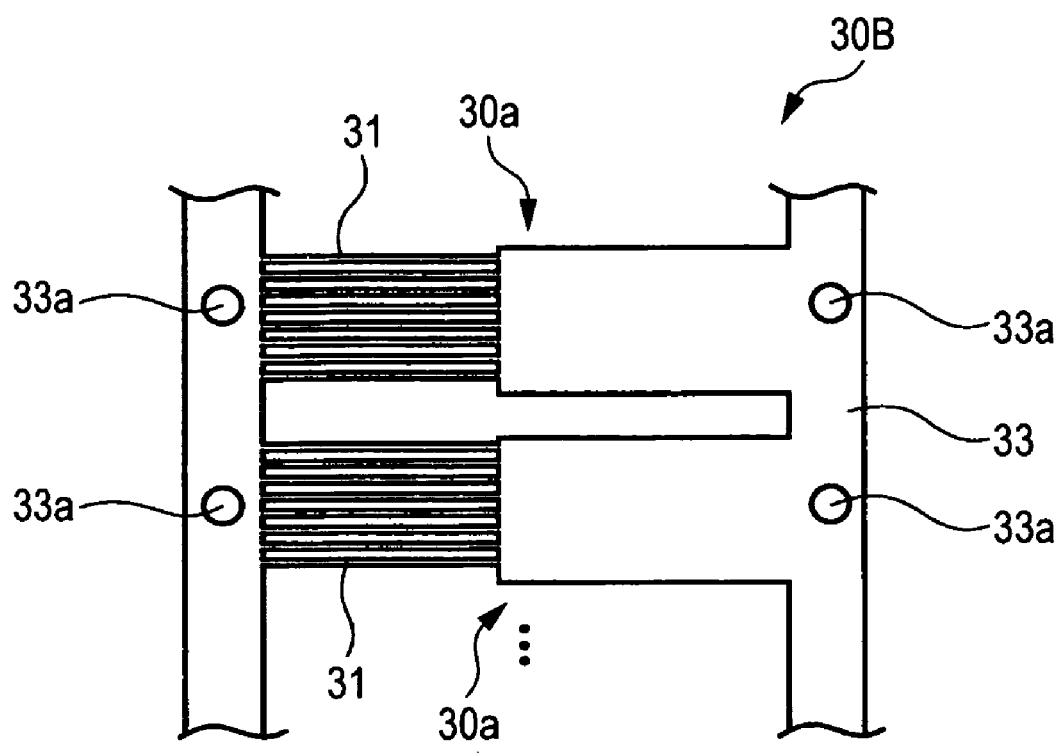
FIG. 10 is a plan view of the wiring plate.
Figure 11:
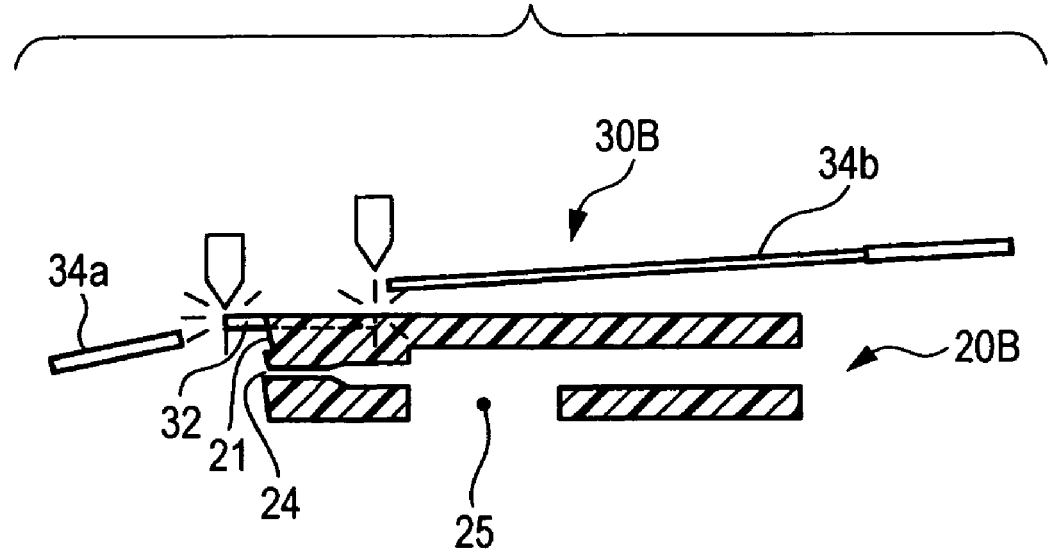
FIG. 11 is a side view showing that unwanted portions of an insert-molded wiring plate are cut.
Figure 12A:
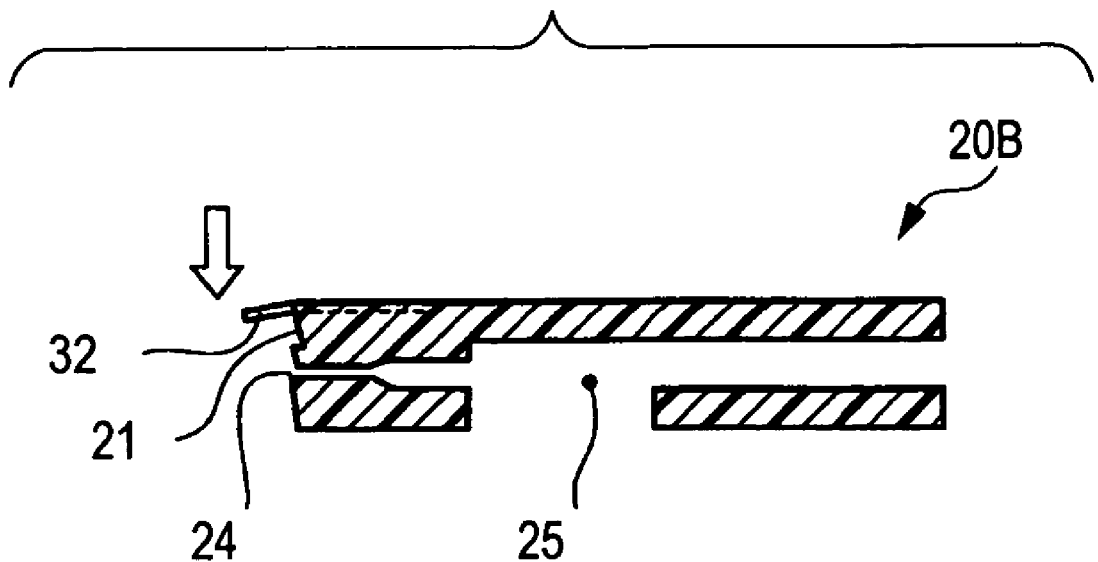
FIG. 12A is a side view showing that unwanted portions are cut, and a portion of the wiring plate is bent.
Figure 12B:
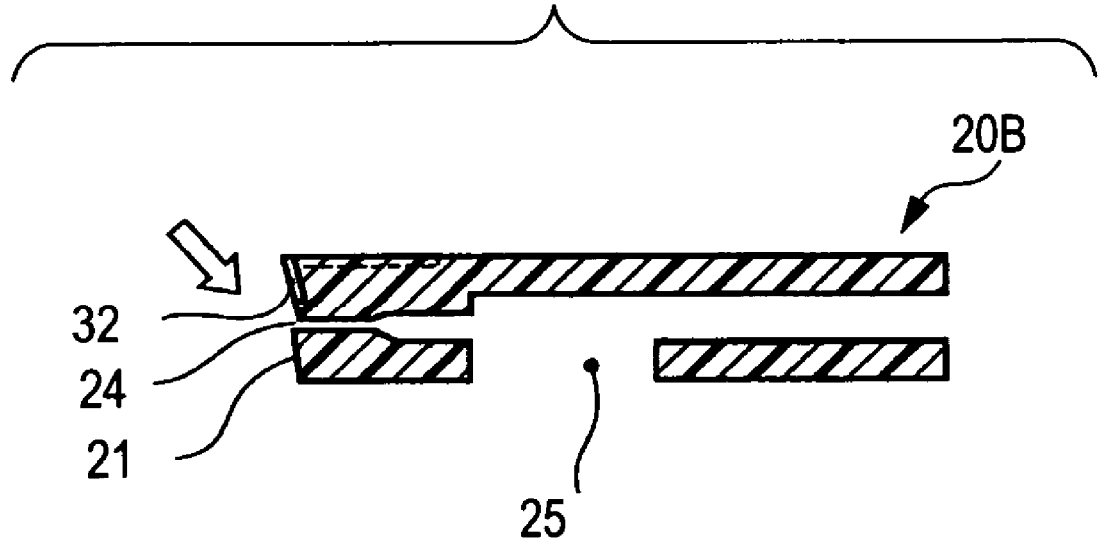
FIG. 12B is a side view showing that a portion of the bent wiring plate is bonded.

FIG. 7 is a cross-sectional view showing a method of manufacturing an optical coupling part according to a second embodiment of the present invention; FIG. 8 is a perspective view of the optical coupling part of the present invention when viewed from the top; FIG. 9 is a cross-sectional view acquired along position III-III shown in FIG. 8; FIG. 10 is a plan view of the wiring plate; FIG. 11 is a side view showing that unwanted portions of an insert-molded wiring plate are cut; FIG. 12A is a side view showing that unwanted portions are cut, and a portion of the wiring plate is bent; and FIG. 12B is a side view showing that a portion of the bent wiring plate is bonded.

Elements common to those of the first embodiment are assigned the same reference numerals, and their repeated explanations are omitted.

As shown in FIGS. 8 and 9, under the method for manufacturing an optical coupling part corresponding to a second embodiment, an electrical wiring section 23 to be electrically connected to the photoelectric conversion element 41, which is connected to the optical fiber 11, is formed in an optical coupling part 10B. Specifically, the electrical wiring section 23 is formed on the edge face 21 of a molded element 20B, into which the leading end portion 11a of the optical fiber 11 is inserted and exposed, and also on the side surface 22 continual to the edge face 21. To this end, the method comprises a step of forming the molded element 20B by means of insert-molding a wiring plate 30B (see FIG. 10), which is to serve as the electrical wiring section 23 and has a plurality of leads 31, and bending and bonding a portion of a non-insert-molded section 32 of the wiring plate 30B along the edge face 21 of the molded element 20B or the side surface 22 continual to the edge face 21 (see FIG. 12A) (see FIG. 12B); and positioning the active layer 42 of the photoelectric conversion element 41 to the end face 11b of the optical fiber 11 exposed in the edge face 21, and fastening the photoelectric conversion unit 40 housing the photoelectric conversion element 41 to the edge face 21 while the electrode terminal section 43 of the photoelectric conversion element 41 remains in contact with the leads 31 of the wiring plate 30B.

As shown in FIG. 10, the wiring plate 30B has a structure wherein units 30a, each of which is used for manufacturing one optical coupling part 10B, are coupled by means of a plurality of ribbons 33. The wiring plate 30B can be automatically fed by means of sprocket holes 33a formed at predetermined intervals in the ribbons 33. Alternatively, when positioning protuberances (omitted from the drawings) are provided on the upper and lower metal molds 51 and 52 or the second slide core 56, the sprocket holes 33a are fitted to the positioning protuberances, thereby positioning the wiring plate 30B.

As shown in FIG. 7, the wiring plate 30B is fed at any time in a direction perpendicular to a drawing sheet, whereby the wiring plate 30B is arranged along the parting line PL along which the upper and lower metal molds 51 and 52 are mated with each other. For instance, when a plurality of metal molds 50 are used, the plurality of metal molds 50 are arranged along the direction in which the wiring plate 30B is fed, so that the wiring plates 30B can be fed to all of the metal molds 50 by single operation.

Accordingly, as shown in FIG. 7, the optical coupling part 10B is manufactured by means of positioning the wiring plate 30B between the upper metal mold 51 and the lower metal mold 52, and assembling together both the metal molds 51, 52. Further, the protuberance section 57 is adjusted to a predetermined height, and the first slide core 55 is inserted. The second slide core 56 is further attached to thus set the metal mold 50. At this time, the wiring plate 30B is fed and positioned by means of the sprocket holes 33a formed in the ribbon portions 33 located along both outer edges of the wiring plate 30B. Resin is applied into the cavity 53 in the metal mold 50, and the wiring plate 30B is insert-molded to thus form the molded element 20B.

Subsequently, the metal mold 50 is disassembled, to thus remove the molded element 20B into which the wiring plate 30B has been insert-molded. As shown in FIG. 11, unwanted portions 34a, 34b of the wiring plate 30B insert-molded on the upper face of the molded element 20B are removed by means of trimming. At this time, as shown in FIG. 8, the leads 31 corresponding to the optical fiber insertion holes 24 formed in the edge face 21 of the main body 10a are cut shortly (i.e., to form short leads 31a), thereby preventing occurrence of an interruption with the optical fiber insertion holes 24.

So long as notches are formed in advance in positions where the leads are to be cut, the leads can be cut readily at accurate positions. Alternatively, thin-wall portions are formed in cut positions by means of half-etching, and the thin-wall portions can be cut.

As shown in FIG. 12A, the non-insert-molded section 32, which is a portion of the wiring plate 30B and is not insert-molded into the molded element 20B, is bent along the edge face 21 of the molded element 20B, and the thus-bent portion is bonded to the edge face 21, as shown in FIG. 12B.

Subsequently, as shown in FIG. 9, the active layer 42 of the photoelectric conversion element 41 is positioned in front of the optical fiber insertion holes 24 of the molded element 20B. The photoelectric conversion unit 40 is attached to the edge face 21 of the molded element 20B such that the electrode terminal section 43 comes into contact with the electrical wiring section 23 of the main body 10a.

According to the method for manufacturing an optical coupling part and the optical coupling part manufactured thereby, both of which pertain to the second embodiment, the wiring plate 30B having the plurality of leads 31 is insert-molded to the side surface 22 continual to the edge face 21 of the molded element 20B. The non-insert-molded section 32 of the wiring plate 30B is bent and bonded to the edge face 21, thereby enabling easy three-dimensional wiring. Drive power can be fed to the photoelectric conversion element 41 disposed opposite the end face 11b of the optical fiber 11 by way of the electrical wiring section 23 of the optical coupling part 10, or a signal from the photoelectric conversion element 41 can be transmitted.

The method for manufacturing an optical coupling part and the optical coupling part manufactured thereby, both of which pertain to the present invention, are not limited to the previously-described respective embodiments but can be subjected to modifications, alterations, or the like, as needed.

As mentioned above, according to the method for manufacturing an optical coupling part and the optical coupling part manufactured thereby, both of which pertain to the present invention, a wiring plate having a plurality of leads is insert-molded to an edge face of a molded element or a side surface continual to the edge face, and hence three-dimensional wiring can be readily effected. As a result, there is yielded an advantage of the ability to electrically connect an optical fiber to a photoelectric conversion element which is to be disposed opposite the edge face of the optical fiber by way of an electrical wiring section of the optical coupling part. For instance, the present invention is useful as a method for manufacturing an optical coupling part for connecting; e.g., an optical fiber, to the photoelectric conversion element, and an electrical coupling part manufactured thereby, and the like.

What is claimed is:

1. A method for manufacturing an optical coupling part for connecting an optical fiber with a photoelectric conversion unit having a photoelectric conversion element, comprising:
    arranging a wiring plate on a mold;
    insert-molding the wiring plate after arranging the wiring plate on the mold, which is to serve as an electrical wiring section and has a plurality of leads, into a molded element into which an optical fiber is to be inserted;
    positioning an active layer of the photoelectric conversion element to an optical fiber insertion hole formed in an edge face of the molded element; and
    fastening the photoelectric conversion unit having the photoelectric conversion element to the edge face of the molded element with an electrode terminal section of the photoelectric conversion element remaining in contact with the leads of the wiring plate.

2. The method for manufacturing an optical coupling part according to claim 1, further comprising a step of:
    bending a portion of the wiring plate and bonding the thus-bent portion to the edge face of the molded element or a side surface continual to the edge face.

3. The method for manufacturing an optical coupling part according to claim 1, further comprising steps of:
    placing, between upper and lower metal molds, a first slide core having a core pin for forming an insertion hole into which is inserted the optical fiber in the molded element, and a second slide core which is disposed opposite the first slide core and forms the edge face of the molded element, and positioning the core pin of the first slide core to the second slide core while the first slide core and the second slide core are brought into close proximity to each other;
    arranging the wiring plate in a cavity formed between the upper and lower metal molds;
    applying resin into the cavity, to thus subject the wiring plate to insert molding; and
    moving the first slide core and the second slide core in a mutually-departing direction and subsequently removing from the metal molds a molded element into which the wiring plate has been insert-molded.

4. The method for manufacturing an optical coupling part defined in claim 1, wherein the wiring plate is arranged along the edge face of the molded element.

5. The method for manufacturing an optical coupling part defined in claim 1, wherein the wiring plate is disposed along a parting line between the upper and lower metal molds.

6. The method for manufacturing an optical coupling part defined in claim 4, wherein the insert-molded wiring plate is subjected to electroless plating before fastening of the photoelectric conversion unit.

7. The method for manufacturing an optical coupling part defined in claim 4, further comprising a step of:
    affixing a fastening tape for preventing occurrence of deformation of the leads, which would otherwise arise during applying resin, to the leads of the wiring plate.

8. The method for manufacturing an optical coupling part defined in claim 7, wherein the fastening tape is formed from a synthetic resin material having heat resistance, such as polyimide.

9. The method for manufacturing an optical coupling part defined in claim 7, wherein the fastening tape is formed from metal which is essentially equivalent to the wiring plate in terms of a coefficient of linear expansion, such as aluminum, copper, or the like.

10. An optical coupling part manufactured under the method for manufacturing an optical coupling part defined in claims 1 through 9.

* * * * *